May 9, 1967   J. M. P. DELSOL   3,318,038
FISHING APPARATUS

Filed Jan. 22, 1965   2 Sheets-Sheet 1

JACQUES M. DELSOL
INVENTOR.

BY

United States Patent Office 3,318,038
Patented May 9, 1967

3,318,038
FISHING APPARATUS
Jacques Marcel Pierre Delsol, Paris, France, assignor to Societe Depson, Paris, France, a corporation of France
Filed Jan. 22, 1965, Ser. No. 427,405
Claims priority, application France, Jan. 31, 1964, 962,160; Nov. 12, 1964, 994,566
2 Claims. (Cl. 43—43.13)

This invention relates to fishing apparatus and, more particularly, to apparatus arranged to permit fishing a considerable distance from shore without the necessity of casting the bait.

One of the common methods of fishing is to provide the hook with bait which is cast out from the shore into an area where it is suspected that there are fish. In such casting, however, the bait is eventually destroyed or becomes disengaged from the hook rather easily. Furthermore, in order to maintain the bait moving through the water in a realistic manner, it is necessary to cast out from shore and then reel the line toward shore, thus requiring a repeated action. In addition, the entry of the bait into the water at the time of casting produces a splash which sometimes scares the fish. These and other difficulties experienced with the prior art devices have been obviated in a novel manner by the present invention.

It is, therefore, an outstanding object of the present invention to provide a fishing apparatus for carrying hook and bait a considerable distance out from shore without casting.

Another object of this invention is the provision of a fishing apparatus in which the bait remains substantially intact, since it is not necessary to make repeated castings.

A further object of the present invention is the provision of a fishing apparatus which is simple in construction, which may be readily manufactured from inexpensive materials, and which is capable of a long life of useful service.

It is another object of the present invention to provide a fishing apparatus consisting of a floating plate for river and sea fishing which enables the user methodically to explore with his bait a clearly-defined stretch of water which is normally inaccessible from the bank by normal fishing methods.

With these and other objects in view, as will be apparent to those skilled in the art, the invention resides in the combination of parts set forth in the specification and covered by the claims appended hereto.

Figure 1:
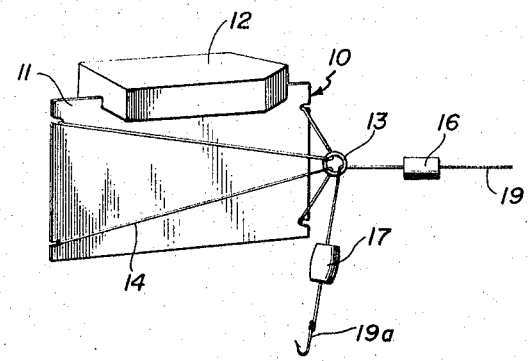
Figure 2:
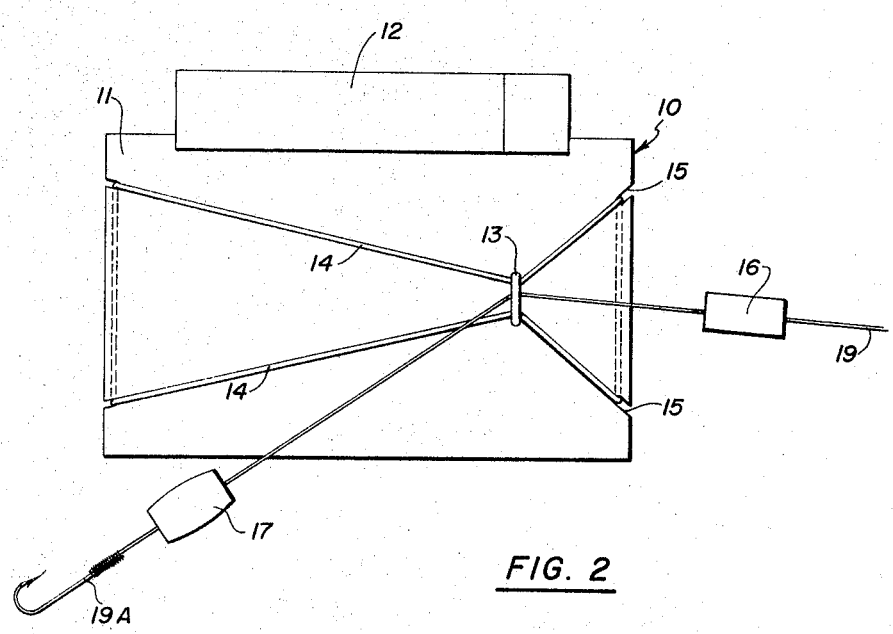
Figure 3:
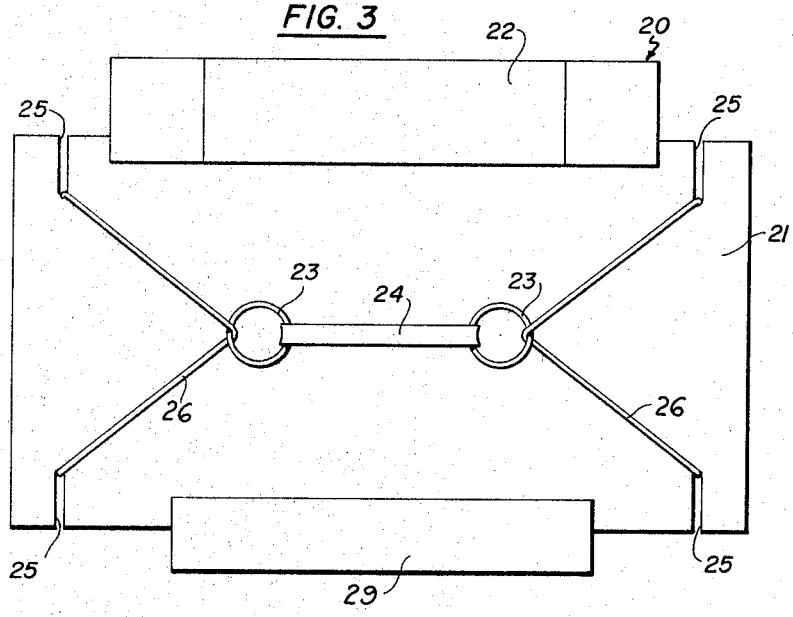
Figure 4:
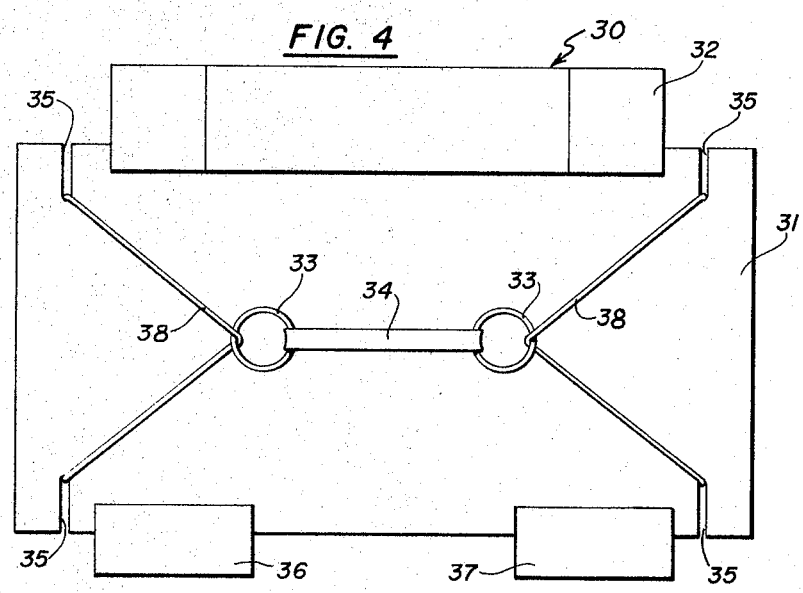

The character of the invention, however, may be best understood by reference to certain of its structural forms, as illustrated by the accompanying drawings in which:

FIG. 1 is a perspective view of a fishing apparatus embodying the principles of the present invention, FIG. 2 is an enlarged elevational view showing the details of the invention, FIG. 3 is an elevational view of a modified form of the invention, and FIG. 4 is an elevational view of a further modification of the invention.

Generally speaking, the present invention consists of a fishing apparatus using a drift member for fishing lines having a vertical plate at the top of which is mounted a float. Fitted to the bottom is a ballast to maintain the plate in a vertical position in the water. One of the sides of the plate is provided with a ring adjusted to slide freely along a system of elastic bands attached to the plate. The line at that point is provided with a cork and olive-shaped sinker strung on the fishing line so as to limit the run of the line through the ring.

Referring first to FIGS. 1 and 2, which show a fishing apparatus 10, which is adapted specifically for use in river fishing, the apparatus consists of a plate 11 made of a material with a density slightly greater than water. This material may be Plexiglas which has a density of 1.185 or may be of a material having a density of 1.3. At the top of the plate is mounted a float 12 having a pointed forward end. Mounted on one of the sides of the plate is a ring 13 mounted to slide freely along portions of an elastic band 14 which is attached to the plate by use of notches 15 located adjacent the four corners of the rectangular plate 11.

Extending through the ring is a fishing line 19 on which are mounted a cork float 16 and (at the other side of the ring) a sinker 17. The float 16 and the sinker 17 are spaced a considerable distance but are larger than the ring 13 so that the movement of the line is limited to the run through the ring.

The operation of the invention will now be readily understood, in view of the above description. After attaching a live bait to the hook 19a at the end of the line 19, the angler moves the drift ring 13 from central position to a position approximately one-third of the distance from the upstream edge of the plate 11. The direction of the current in the river is from the right to the left in FIG. 1. He places the apparatus in the water near the bank without casting it. He then walks up the bank of the river against the direction of the stream exerting tension on the line. This has the effect of elastically moving the ring 13 away from the plane of the plate 11, thus forming an irregular quadrangular lateral pyramid, the apex of which is the ring 13, the sides of which are formed by the portions of the rubber band 14. The plate 11 automatically and instantaneously adapts itself to the current and the sinker 17 comes up to the ring 13 but cannot pass through it. The result is that, by the action of the two contrary forces, i.e., the force of the current on the plate 11 due to the position of the plate caused by the formation of the elastic quadrangular pyramid described above and the continued tension exerted by the angler on the fishing line 19, the plate and apparatus move up the current without difficulty describing a circle of which the angler is the center.

When the angler decides that the apparatus has moved out into the current sufficiently, he ceases to exert tension on the line 19. The apparatus then follows the current, carrying with it the live bait fixed to the hook 19a on the line. The ring 13 retracts against the plate 11 again and the fishing line runs through the ring until the cork 16 comes up against the ring. When the angler decides that the apparatus has traveled sufficiently far downstream, he again exerts tension on the line, moves along the bank against the current and, as before, the apparatus again moves out and up the stream.

It can be seen, then, that it is possible methodically to explore well-defined stretches of water which normally would be inaccessible from the bank. This can be done without difficulty and without stopping and with a minimum strain on the live bait attached to the hook on the line.

When the fishing has been completed, the user gives a sharp jerk on the line 19 and the plate 11 turns on its side and lies flat on the water, so that it can be easily brought in to the bank by skimming it over the surface of the water.

It can be seen that this system of elastic attachment of the ring 13 to the plate 11 by a rubber band has considerable advantages. For one thing, the apparatus automatically and instantaneously assumes the optimum angle of attack to the current when tension is exerted on the line 19. Furthermore, it acts as a perfect absorber for all the vibrations to which the apparatus may be subjected. It also enables the angler, when he desires to bring the apparatus back to the bank, to give a sharp jerk on the line and change the plate instantaneously from a vertical position to a horizontal position, so that it may skim over the surface of the water with the least resistance on its way to the angler. Finally, the apparatus instantly resumes a vertical position when the angler ceases to exert tension on the line.

FIG. 3 shows a modification of the invention which may be used when fishing in the ocean. Basically, a ballast is attached to the base of the plate to assure its rapid and constant stabilization by neutralizing the effect of waves which tend to turn it on its side. For instance, FIG. 3 shows a fishing apparatus 20. The plate 21 is provided in its upper portion with a float 22 which is pointed at both ends. The plate is provided with slots 25 receiving the threads 26 which operate in the slots 25 and carry two rings 23 between which extends an elastic band 24. At the bottom part of the plate is provided a ballast 29 suitably formed of lead or the like. The band 24 is elastic, while the threads 26 are preferably of nylon, or other strong material. The line is run through one of the rings 23 in the manner described above in connection with the version of the invention shown in FIGS. 1 and 2. By the action of the current on the plate 21 and the tension exerted by the fisherman on the line, the two rings 23 move away from the surface of the plate and a prism with an irregular elastic quadrangular base is formed, of which the line between the rings 23 is the vertex. In this way, the apparatus automatically instantaneously assumes the optimum angle of attack to the current and moves against it without difficulty and without stopping, describing an arc of a circle of which the fisherman is the center. Depending upon the direction of the current, a selected one of the two rings 23 is used in such a way as to be located a predetermined distance away from the upstream edge of the plate and is actuated by the line.

The modification of the invention shown in FIG. 4 consists of a fishing apparatus 30 having a plate 31 which has mounted at its upper end a float 32 whose ends are pointed. Two rings 33 are connected to the plate by use of nylon strings 38 and joined together by an elastic band 34. The strings 38 are connected to the plate by means of slots 35 and, at the bottom of the plate, are located two lead ballast members 36 and 37. Otherwise, this apparatus operates in the same way as the apparatus described in FIG. 3 and is capable of moving against current in either direction.

It is obvious that minor changes may be made in the form and construction of the invention without departing from the material spirit. It is not, however, desired to confine the invention to the exact form herein shown and described, but it is desired to include all such as properly come within the scope claimed.

The invention having been thus described, what is claimed as new and desired to secure by Letters Patent is:

1. Fishing apparatus, comprising a plate having a float at its upper end to maintain the plate vertical in the water, a ring mounted on one of the sides of the plate, and means providing an elastic connection between the ring and the plate, the means being configured to provide an irregular quadrangular pyramid, the apex of which is the ring, thus enabling the plate automatically and instantaneously to adapt itself to current in a river to move along the current and to absorb vibrations to which the apparatus is subject.

2. Fishing apparatus, comprising a plate having a float mounted at its upper end to maintain the plate vertical in the water, a ring mounted on one of the sides of the plate, and elastic means between the ring and the plate, the plate being provided with a notch at each corner and the said means being an elastic band extending through the notches, the elastic means also comprising a tiltable control connection between the ring and the plate enabling the user by giving a sharp jerk on the fishing line to turn the plate from the vertical to the horizontal and to skim it back to the bank with a minimum of effort.

References Cited by the Examiner
UNITED STATES PATENTS

| | | | |
|---|---|---|---|
| 691,407 | 1/1902 | Pacetty | 43—44.9 X |
| 2,542,347 | 2/1951 | Muller | 43—43.13 |
| 2,677,208 | 5/1954 | Newton | 43—43.14 X |
| 2,862,326 | 12/1958 | Minera | 43—43.13 |

SAMUEL KOREN, *Primary Examiner.*

D. J. LEACH, *Assistant Examiner.*